Figure 1:
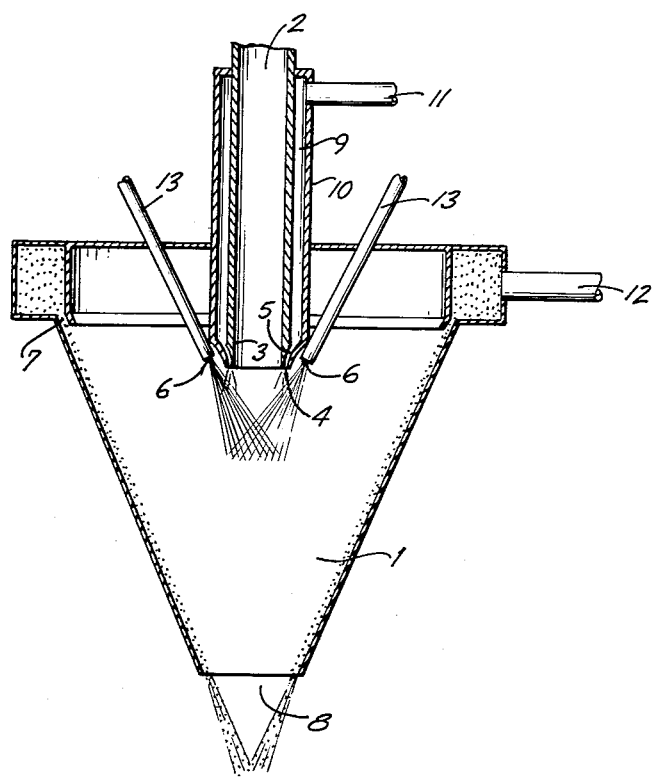

Jan. 2, 1962    R. WIMMER ETAL    3,015,619
PROCESS AND DEVICE FOR CHILLING HOT CRACKED GASES
Filed Feb. 24, 1959    2 Sheets-Sheet 1

INVENTORS.
RUDOLF WIMMER
RUDOLF WIRTZ
WILLI PORTZ
WERNER FISCHER
HARMUT SCHILKEN
BY
Curtis, Morris & Safford
ATTORNEYS.

3,015,619
PROCESS AND DEVICE FOR CHILLING HOT CRACKED GASES

Rudolf Wimmer, Rudolf Wirtz, and Willi Portz, Frankfurt am Main, Werner Fischer, Bad Soden (Taunus), and Hartmut Schilken, Frankfurt am Main, Germany, assignors to Farbwerke Hoechst Aktiengesellschaft vormals Meister Lucius & Brüning, Frankfurt am Main, Germany, a corporation of Germany
Filed Feb. 24, 1959, Ser. No. 795,076
Claims priority, application Germany Feb. 26, 1958
14 Claims. (Cl. 208—48)

The present invention relates to a process and to a device for chilling hot cracked gases obtained by thermal treatment of hydrocarbons, especially at very high temperatures.

The invention can be used with special advantage for interrupting cracking processes in which the reaction must be interrupted before the expected equilibrium is achieved without, however, cooling the cracked gas to a temperature at which the sensible heat of the gas can no longer be utilized.

It is known that upon chilling hot cracked gases relatively great amounts of carbon and tar products are separated which deposit on the walls of the chilling device and produce obstructions that soon make further operation impossible.

Various processes have already been proposed or carried out to avoid or remove these deposited materials. Thus there are processes wherein the reacted gases, prior to being chilled, are liberated in a cyclone from part of the solid substances. In a cyclone the necessarily short residence time can, however, be adjusted only with difficulty. Other processes use a great excess of water to produce sudden chilling. In this case, great quantities of very impure water are obtained which must be treated at great expense before it can be led off as waste water or recycled into the cracking process. Moreover, the sensible heat of the gases is absorbed by the waste water. Hydrocarbon oil alone cannot on principle be used as a chilling agent in high temperature pyrolysis as the oil would be decomposed and great amounts of tar would be formed. When used in a medium temperature pyrolysis, the heat can be recovered but the oil becomes useless after a short time. There are also used mechanical devices for the removal and elimination of deposited residues, devices which are, however, very complicated so that they can only be used for chilling cracked gases produced by low temperature pyrolysis.

The present invention provides a process which enables all the aforesaid difficulties to be overcome. In accordance with the invention a current of hot gases which has a temperature of between 700° C. and 1400° C. or even a still higher temperature depending on the reaction conditions applied, is chilled with a relatively cool liquid, such as a liquid hydrocarbon especially of aliphatic nature, and preferably with water, the liquid being used in a quantity sufficient to cool the gas current to a temperature at which the gas components do not undergo substantial decomposition in the time of residence applied, that is to a temperature at which the cracking reaction is frozen, while the inside walls of the chilling space are simultaneously washed with a hydrocarbon oil, for example a hydrocarbon oil obtained as residue in the pyrolysis. If desired, various chilling liquids may be injected into the chilling space if this is deemed advisable. The coke and the tar products formed upon chilling are absorbed by the wash liquid and so discharged from the chilling space. The wash liquid used should be either undistillable or only difficultly distillable or should boil at a temperature substantially higher than the chilling liquid. The boiling point of the chilling liquid should be at least about 100° C. at atmospheric pressure and should be substantially lower, for example more than 70° C. below the temperature at which substantial amounts of wash liquid, for example more than 30%, can be distilled at atmospheric pressure. On leaving the chilling space, the wash liquid is advantageously intensely contacted with the gas current which has previously been chilled by means of the chilling liquid, for example water, to a temperature of 700° C. to 400° C., preferably 550° C. to 400° C. or even to a still lower temperature; the wash liquid absorbs thereby a further amount of suspended non-gaseous particles (solid substances and tar products) which have not yet deposited on the liquid film washing the walls of the chilling space and which appear as aerosols in the cracked gas.

During this contact between gas and liquid, the latter is heated and may be wholly or partially evaporated. Thus, for example, lower boiling ingredients contained in the wash liquid may be evaporated. The heat absorbed by the liquid and evaporated ingredients of the wash liquid may be partially recovered by heat exchange and used for generating steam and/or for heating other media used in the preceding cracking process or for other purposes, for example for preheating the substances to be cracked. When the chilling liquid contains or consists of substances capable of being cracked, it can also be cracked by means of the hot gas current, whereby the yield of olefins, such as ethylene, propylene and butylene, is further increased.

As wash liquid for the walls of the chilling space there may advantageously be used a hydrocarbon residue oil similar in composition to that of the materials deposited on the walls of the chilling space. By the thermal cracking of hydrocarbons at very high temperatures, for example, liquid and tarry products are formed in addition to gaseous substances. These liquid and tarry substances can be used with special advantage as wash liquid in accordance with this invention and it is immaterial whether they are viscous or solid at normal temperature and become liquid only at the working temperature.

The temperatures at which the wash oil is used is advantageously kept between 100° C. and 350° C., preferably between 150° C. and 250° C., so as to have a sufficient temperature gradient for the heat exchange. The hot gases are preferably chilled with water finely atomized into the gas current leaving the gas inlet and entering the chilling space; the water is used in an amount such that the desired temperature is produced by the heat absorption of the water and its evaporation. In view of the fact that water upon contacting hot oil may involve strong foaming so that the liquid film on the walls of the chilling space may be destroyed and become inactive, it is advantageous to previously heat the water under pressure to 100° C.– 200° C., preferably 100° C.–150° C., whereby foaming can be avoided. Upon leaving the nozzle, the superheated water is atomized to form a mist of fine water droplets e.g., by maintaining the water under a pressure higher than that prevailing in the chilling space. As a result of the fine atomization of the water droplets, they are practically instantaneously evaporated and the hot gas current is very uniformly cooled to the desired temperature within the shortest possible time. When a cooling liquid other than water, for example petrol or gasoline, is used, it may be advantageous to use it as superheated liquid.

The temperature to which the gas current to be chilled is cooled by injecting the chilling liquid depends on the conditions to be observed. When, for example, the chilling takes place following the thermal cracking of hydrocarbons in order suddenly to chill the cracked gases as it is usual, for example, in the manufacture of acetylene and/or olefins, such as ethylene, it is advantageous to use the chilling liquid, for example water, in a quantity such that a temperature is produced at which the acetylene and ethylene obtained by cracking are only little decomposed. This temperature varies generally between 700° C. and 400° C.

If a relatively small amount of chilling liquid is used so that the gas current has a relatively high temperature after chilling, for example a temperature of between 500° C. and 700° C., it may happen that part of the liquid film washing the walls of the chilling space and vapors of said liquid are cracked by the gas current whereby a further amount of olefins, such as ethylene or propylene, are formed. In this case part of the chilling liquid is consumed. When, however, the chilling liquid is injected in an amount such that the gas current is chilled to a low temperature, for example lower than 500° C., the liquid film is only cracked slightly and practically no wash liquid is consumed. The temperature down to which the gas current is chilled is therefore dependent on the conditions to be observed in each case. For example, it may be advantageous to partially crack the wash liquid, for example a hydrocarbon residue oil, in order to additionally produce valuable unsaturated hydrocarbons, for example ethylene.

Sometimes, it is, however, advantageous to chill the gas current to a temperature at which relatively little wash liquid is consumed. The deposition of solid substances on the walls or possible insertions of the chilling space is in any case avoided as a result of the embodiments described above.

An apparatus suitable for use in carrying out the process of this invention is shown diagrammatically in the accompanying drawings.

Figure 2:
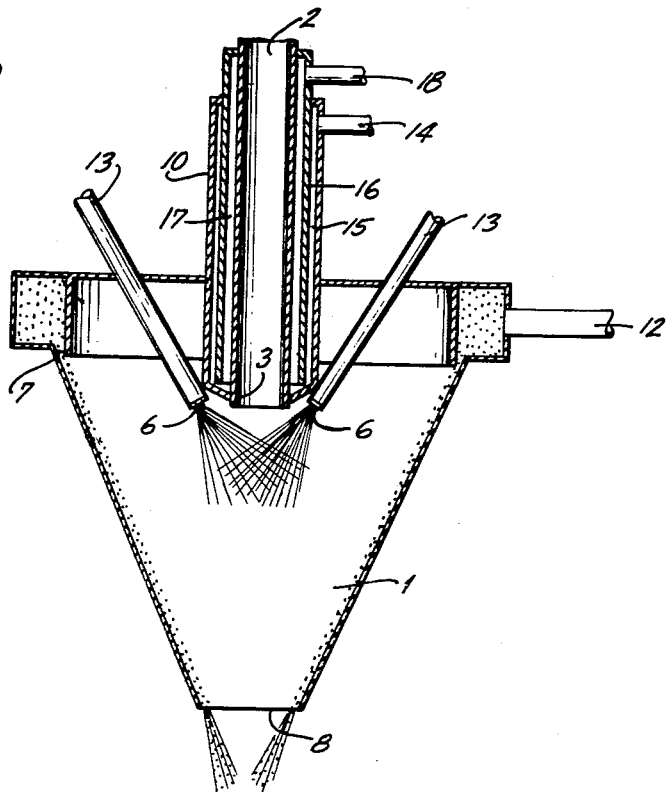

Referring to the drawings:

FIGURES 1 and 2 show a variant of the chilling space, a variant of washing the walls of the chilling space, and an exemplary arrangement of the nozzles which serve to atomize and inject the chilling agent into the chilling space. FIGURES 1 and 2 also show how the gases are introduced into the chilling space.

Through supply pipe 2 the current of hot gas is introduced into chilling space 1 which is of cylindrical or, advantageously conical shape. Through annular conduits provided with nozzles 6 a quantity of chilling liquid is atomized into the gas current leaving supply pipe 2 and entering into chilling space 1 so that the gas current is chilled to the desired temperature. Through slit 7 the walls of the chilling space are washed with a hydrocarbon oil. The washing liquid is fairly intimately contacted in cross-sectional area 8 with the gas that has been cooled to a temperature which does not affect the washing liquid, and then discharged downwards together with the gas through open cross-sectional area 8.

In FIGURE 1 a second concentric tube 10 is arranged around gas inlet 2 to leave an annular space 9 into which steam or another suitable cooling medium, for example hydrocarbon vapors, are introduced through inlet 11 to cool the end 3 of gas inlet 2. The end 3 is advantageously cooled to a temperature of between 100° C. and 300° C. since, in case it is superheated, the vapors of the hydrocarbon residue oil used as wash liquid for the walls of the chilling space may be cracked and so entrain deposits. The end 3 of gas supply pipe 2 and the end 5 of jacket tube 10 form a slit 4 through which the cooling medium, which travels advantageously in a direction concurrent to the gas current, enters chilling space 1 at high speed; slit 4 is vapor washed to keep it free from deposited unchilled gas. The inner limitation 3 and the outer limitation 5 of slit 4 are shaped as sharp annular cuttings to limit to a minimum the only surface at which carbonaceous and tarry products can deposit. The chilling liquid is introduced through inlets 13 provided with nozzles 6. Slit 7 which is supplied with oil by means of pipe 12 and serves to wash the walls of the chilling chamber may be replaced by nozzles arranged in annular manner or an overflow dam without the desired effect being impaired.

FIGURE 2 shows an embodiment in which the liquid or gaseous medium, for example steam or hydrocarbon vapors, or a high boiling liquid, such as a residue oil or diphenyl, used for cooling cutting 3 does not enter into chilling space 1; the cooling medium is introduced at 14, travels through annular space 15 to the lower open end of pipe 16, is there reversed to travel upwards through annular space 17 formed by pipes 16 and 2 and leaves at 18. The cooling medium cools annular cutting 3 and while passing through annular space 17 it is superheated at pipe 2. After having left pipe 18, the cooling medium can be recycled into the cracking process or can be used for other purposes.

The annular cuttings 3 and the pipe 2 are advantageously made of steel resisting to high temperatures.

Figure 3:
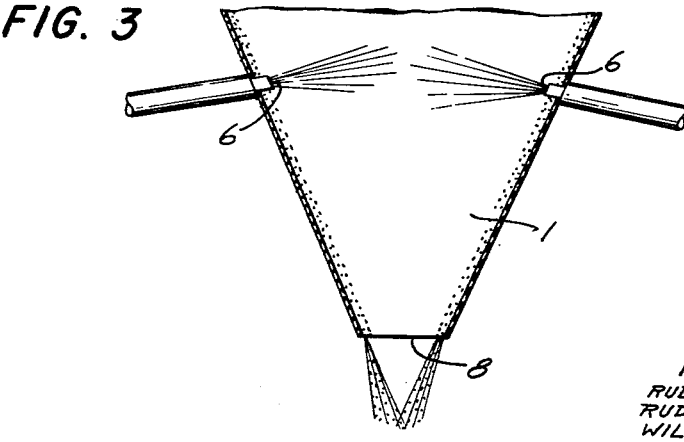

According to a further modification of the embodiment shown in FIG. 3, the nozzles 6 which serve to introduce the chilling liquid can be inserted with special advantage into the walls to be washed of the chilling space 1; in this case the wash liquid protects simultaneously the nozzles against the deposition of carbonaceous and tarry products.

In accordance with this invention the reaction is chilled with water or a relatively low boiling chilling liquid, while the higher boiling wash oil is used to dissolve and remove constituents of the cracked reaction products. Depending on the conditions selected, the wash oil may be allowed to become as hot as for example about 300° C. or more, at which temperature the heat can be recovered in economic manner in a heat recovery unit connected in series. In view of the fact that the cracked gases are cooled to a temperature of 500° C., for example, before they come into contact with the wash oil, the latter is only little cracked so that the cracked residue oil obtained during the cracking reaction is sufficient to compensate the wash oil lost by cracking.

The following examples serve to illustrate the invention, but they are not intended to limit it thereto:

*Example 1*

A current of cracked gas (84 m.$^3$/h.; N.T.P) of 1100° C. flowed through reactor 2 into chilling space 1. By means of inlet 11 and annular nozzle 4 30 kg./h. of vapor were introduced into the chilling space to chill the current of cracked gas to 510° C. together with water preheated to 140° C. and introduced through inlet 13 and nozzle 6. About 1.5 tons/h. of very aromatic oil obtained during the cracking reaction were supplied through pipe 12. The oil formed a film on the walls of the funnel shaped chilling space, cooled the cracked gas to 220° C. and absorbed the tarry and solid particles.

*Example 2*

550 m.$^3$/h. (N.T.P) of cracked gas of 1170° C. flowed through reactor 2 into chilling space 1. By means of inlet 11 and annular nozzle 4 40 kg./h. of vapor were introduced into the chilling space to chill the cracked gases to 520° C. together with chilling water preheated to 125° C. and introduced through inlet 13 and nozzle 6. About 7.18 tons/h. of aromatic hydrocarbon residue oil were supplied through inlet 12. The oil formed a film on the walls of the funnel shaped chilling space, cooled the cracked gas to 230° C. and absorbed tarry and solid particles. The oil flowed off at a temperature of 230° C.

We claim:

1. A process for chilling hot cracked gases having a temperature of at least 700° C. which comprises passing hot cracked gases to leave a shaped zone at a passage which is shaped as a cutting in the direction of flow and which is held at a temperature in the range from 100 to 300° C., then cooling down said hot cracked gases to a temperature at which the cracking reaction is quenched by bringing them into contact with water which is vaporized thereby, substantially removing non-gaseous particles which are suspended in said chilled cracking gas therefrom by means of a film of hydrocarbon oils which are of a nature such that no substantial amounts thereof are distillable under normal pressure.

2. A process for chilling hot cracked gases having a temperature of at least 700° C. which comprises passing hot cracked gases to leave a shaped zone at a passage which is shaped as a cutting in the direction of flow and which is held at a temperature in the range from 100 to 300° C., by means of steam which is streaming in the same direction as the cracked gases along the outside of the shaped zone which the said hot cracked gases leave and which is separated from that zone by construction material until it reaches the passage shaped as cutting, then cooling down that hot cracked gases to a temperature at which the cracking reaction is quenched by bringing them into contact with water which is vaporized thereby, substantially removing non-gaseous particles which are suspended in said chilled cracked gas therefrom by means of a film of hydrocarbon oils which are of a nature such that no substantial amounts thereof are distillable under normal pressure, said film of hydrocarbon oils surrounding the quenching zone.

3. A process as claimed in claim 1, wherein superheated water is used which has a temperature in the range from 100 to 200° C.

4. A process as claimed in claim 1, wherein the superheated water has a temperature in the range from 100 to 150° C.

5. A process as claimed in claim 1, wherein the film of hydrocarbon oil is maintained at a temperature in the range from 100 to 350° C.

6. A process as claimed in claim 1, wherein the hydrocarbon oil used for removing the non-gaseous particles is maintained at a temperature in the range from 150 to 250° C.

7. A process as claimed in claim 1, wherein the hydrocarbon oil is in part cracked whereby the yield of olefins is increased.

8. A process as claimed in claim 1, wherein residual particles suspended in the cracked gas are substantially removed therefrom by contacting the cracked gas with a spray of the hydrocarbon oil used as film.

9. A process as claimed in claim 1 wherein a passage, at which the cracked gases enter the quenching zone, is cooled.

10. A process as claimed in claim 9 wherein the passage, at which the cracked gases enter the quenching zone, is cooled by means of steam which is streaming in the same direction as the cracked gases.

11. Apparatus for chilling hot cracked gases which comprises (1) a quench chamber having a downwardly converging wall (2) as gas inlet tube coaxial therewith and having an inner end for introducing said hot gases downwardly into the upper portion of the quench chamber, (3) means for maintaining the inner end of the tube at a temperature between about 100 and 300° C., (4) nozzle means adjacent said inner end having an annular cutting for introducing a stream of heated water into and convergent with hot gases as they enter the quench chamber for chilling them to between about 400 and 700° C., and (5) means for forming and maintaining a continuously moving film of hydrocarbon oil over the converging wall of the quench chamber.

12. An apparatus as claimed in claim 11, wherein the supplying nozzles for the chilling liquid are arranged in the walls which are covered by the film of the hydrocarbon oil.

13. An apparatus as claimed in claim 11 wherein the annular cutting is surrounded by an annular slit, through which the coolant is introduced and the outer limitation of which is likewise shaped as an annular cutting.

14. An apparatus as claimed in claim 11 wherein the inlet tube is surrounded by two annular spaces which are formed by two co-axially arranged tubes which are connected together at the end being adjacent to the annular cutting and thus represent a means for cooling the annular cutting.

References Cited in the file of this patent

UNITED STATES PATENTS

| | | |
|---|---|---|
| 2,305,046 | Tyson | Dec. 15, 1942 |
| 2,791,549 | Jahnig | May 7, 1957 |

FOREIGN PATENTS

| | | |
|---|---|---|
| 321,473 | Great Britain | Nov. 14, 1929 |